(12) United States Patent
La et al.

(10) Patent No.: US 12,429,593 B2
(45) Date of Patent: Sep. 30, 2025

(54) SYSTEM FOR DETECTING GROUND SUBSIDENCE USING LiDAR TECHNOLOGY

(71) Applicant: Lambda innoVision Inc., Hwaseong-si (KR)

(72) Inventors: Jong Pil La, Hwaseong-si (KR); Ji Eun Choi, Hwaseong-si (KR)

(73) Assignee: Lambda inno Vision Inc., Hwaseong-si (KR)

( * ) Notice: Subject to any disclaimer, the term of this patent is extended or adjusted under 35 U.S.C. 154(b) by 0 days.

(21) Appl. No.: 19/052,724

(22) Filed: Feb. 13, 2025

(65) Prior Publication Data
US 2025/0271575 A1     Aug. 28, 2025

(30) Foreign Application Priority Data
Feb. 28, 2024 (KR) .......... 10-2024-0028576

(51) Int. Cl.
*G01S 17/00* (2020.01)
*G01S 17/88* (2006.01)

(52) U.S. Cl.
CPC .................... *G01S 17/88* (2013.01)

(58) Field of Classification Search
USPC ...................................... 356/4.01
See application file for complete search history.

(56) References Cited

U.S. PATENT DOCUMENTS

| | | | | |
|---|---|---|---|---|
| 11,428,527 B2* | 8/2022 | Ohhashi | ......... | B64U 20/87 |
| 2015/0106004 A1* | 4/2015 | Taylor | ......... | G01S 15/46 |
| | | | | 701/300 |
| 2018/0089852 A1* | 3/2018 | Baker | ......... | G06T 7/246 |
| 2020/0326187 A1* | 10/2020 | Ohhashi | ......... | B64U 20/87 |
| 2024/0183876 A1* | 6/2024 | Hiller | ......... | B64D 47/02 |
| 2025/0137926 A1* | 5/2025 | Darcie | ......... | G01N 21/39 |

FOREIGN PATENT DOCUMENTS

| | | | | | |
|---|---|---|---|---|---|
| KR | 101569654 B1 | | 11/2015 | | |
| KR | 102265484 B1 | * | 6/2021 | ......... | G01V 3/02 |
| KR | 102565689 B1 | | 8/2023 | | |
| WO | WO-2022088334 A1 | * | 5/2022 | ......... | G01S 7/481 |
| WO | WO-2023150884 A1 | * | 8/2023 | ......... | G01N 21/39 |

OTHER PUBLICATIONS

Office Action of Korean Application 10-2024-0028576 dated Mar. 18, 2024.

* cited by examiner

*Primary Examiner* — James R Hulka
(74) *Attorney, Agent, or Firm* — Dinsmore & Shohl LLP; Yongsok Choi, Esq.

(57) ABSTRACT

Disclosed are a device and system for detecting ground subsidence by using a LiDAR technology. The system for detecting ground subsidence, which detects whether the ground has subsided within an area where the subsidence of the ground will be examined includes at least two reflection units installed in a structure disposed within an area where the subsidence of a ground will be examined and each configured to reflect light incident thereon, and a LiDAR device disposed within a preset radius from the structure and configured to detect whether the ground has subsided and the extent of the ground subsidence based on a distance difference between the LiDAR device and each of the reflection units.

10 Claims, 7 Drawing Sheets

SYSTEM FOR DETECTING GROUND SUBSIDENCE USING LiDAR TECHNOLOGY

CROSS-REFERENCE TO RELATED APPLICATION

The present application claims priority under 35 U.S.C. § 119(a) to Korean Patent Application No. 10-2024-0028576, filed in the Korean Intellectual Property Office on Feb. 28, 2024, the entire disclosure of which is incorporated herein by reference.

This research was carried out with the support of The Korea Planning & Evaluation Institute of Industrial Technology by the finances of the government of the Republic of Korea (The Ministry of Trade, Industry and Energy) in 2024 (a unique project number: 2410003904, a detailed project number: 20024096, a project name: Development of a Solid State FMCW LiDAR Under 300cc for Autonomous Robots to Cope with Harsh Indoor and Outdoor Driving Conditions (Snow, Smoke, Dust, etc.).

BACKGROUND

1. Technical Field

The present disclosure relates to a system for detecting ground subsidence, which can appropriately detect whether the ground has subsided by using a LiDAR technology.

2. Related Art

Contents described in this part merely provide background information of the present embodiment, and do not constitute a conventional technology.

The ground may be deformed by subsidence or uplifting attributable to various elements (e.g., a drop of an underground water level or the rupture of water and sewerage pipes). A road or building may break down or collapse by the deformation of the ground.

Accordingly, there is a need to prevent potential damage by detecting the deformation of a surround ground under construction or determine the stability of a constructed structure by measuring the deformation state of a ground around the already constructed structure.

Accordingly, a device for detecting ground subsidence is being researched.

A construction structure, including an apartment house or a house, or a subterranean (or underground) engineering or construction structure, such as a gas pipe, water and sewage pipes, a pipeline, a manhole, a dam, a bridge, a building, and a power plant, must be constructed based on the ground. However, if allowable ground bearing capacity is weak, if the thickness of a weak stratum is changed, if heterogeneous strata are present, or if an underground water level is changed, ground subsidence or ununiform settlement occurs. For such reasons, the potential subsidence of the ground inevitably occurs in a predetermined area before and after construction is completed.

There is a need to detect whether the ground has subsided because ground subsidence may cause a major accident.

In general, the measurement of ground subsidence is performed at a point in the distance because ground subsidence commonly occurs very minutely in a wide area rather than locally occurring in a narrow area. However, it is very difficult to measure ground subsidence of about several mm by using various optical components (e.g., a telescope) at long distance and to measure ground subsidence because an optical component needs to maintain the same orientation angle for a long period of time.

SUMMARY

An embodiment of the present disclosure is directed to providing a system for detecting ground subsidence, which can appropriately detect whether the ground has subsided by using a LiDAR technology.

According to an aspect of the present embodiment, there is provided a system for detecting ground subsidence, which detects whether a ground has subsided within an area where the subsidence of the ground is to be examined, including at least two reflection units installed in a structure disposed within an area where the subsidence of a ground is to be examined and each configured to reflect light incident thereon and a LiDAR device disposed within a preset radius from the structure and configured to detect whether the ground has subsided and the extent of ground subsidence based on a distance difference between the LiDAR device and each of the reflection units.

According to an aspect of the present embodiment, the LiDAR device is disposed at a preset height.

According to an aspect of the present embodiment, the LiDAR device is installed in the structure having a preset height or is disposed at a preset height within the structure.

According to an aspect of the present embodiment, the at least two reflection units are disposed at places that are higher and lower than a height at which the LiDAR device is disposed, respectively.

According to an aspect of the present embodiment, the LiDAR device stores, as a reference value, a distance difference between the LiDAR device and each of the at least two reflection units at first timing at which the detection of whether the ground has subsided and the extent of ground subsidence is started or at preset reference timing.

According to an aspect of the present embodiment, the LiDAR device checks whether the ground has subsided based on whether a distance difference between the LiDAR device and each of the at least two reflection units is different from the reference value at arbitrary timing by comparing the distance difference with the reference value.

According to an aspect of the present embodiment, the LiDAR device checks the extent of ground subsidence based on the extent that the distance difference between the LiDAR device and each of the at least two reflection units is different from the reference value at the arbitrary timing by comparing the distance difference with the reference value.

As described above, an aspect of the present embodiment has an advantage in that whether the ground has subsided can be detected precisely and smoothly by using a LiDAR technology.

DETAILED DESCRIPTION

Figure 1:
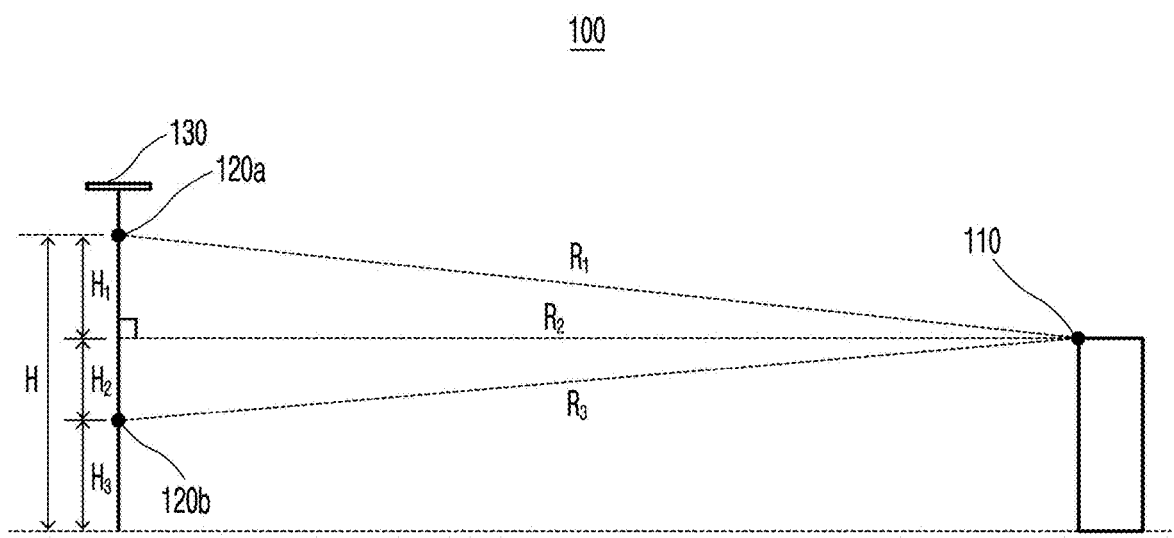
FIG. 1 is a diagram illustrating a construction of a system for detecting ground subsidence according to an embodiment of the present disclosure.

The present disclosure may be changed in various ways and may have various embodiments. Specific embodiments are to be illustrated in the drawings and specifically described. It should be understood that the present disclosure is not intended to be limited to the specific embodiments, but includes all of changes, equivalents and/or substitutions included in the concept and technical range of the present disclosure. Similar reference numerals are used for similar components while each drawing is described.

Terms, such as a first, a second, A, and B, may be used to describe various components, but the components should not be restricted by the terms. The terms are used to only distinguish one component from another component. For example, a first component may be referred to as a second component without departing from the scope of rights of the present disclosure. Likewise, a second component may be referred to as a first component. The term "and/or" includes a combination of a plurality of related and described items or any one of a plurality of related and described items.

When it is described that one component is "connected" or "coupled" to the other component, it should be understood that one component may be directly connected or coupled to the other component, but a third component may exist between the two components. In contrast, when it is described that one component is "directly connected to" or "directly coupled to" the other component, it should be understood that a third component does not exist between the two components.

Terms used in this application are used to only describe specific embodiments and are not intended to restrict the present disclosure. An expression of the singular number includes an expression of the plural number unless clearly defined otherwise in the context. In this specification, a term, such as "include" or "have", is intended to designate the presence of a characteristic, a number, a step, an operation, a component, a part or a combination of them, and should be understood that it does not exclude the existence or possible addition of one or more other characteristics, numbers, steps, operations, components, parts, or combinations of them in advance.

All terms used herein, including technical terms or scientific terms, have the same meanings as those commonly understood by a person having ordinary knowledge in the art to which the present disclosure pertains, unless defined otherwise in the specification.

Terms, such as those defined in commonly used dictionaries, should be construed as having the same meanings as those in the context of a related technology, and are not construed as ideal or excessively formal meanings unless explicitly defined otherwise in the application.

Furthermore, each construction, process, procedure, or method included in each embodiment of the present disclosure may be shared within a range in which the constructions, processes, procedures, or methods do not contradict each other technically.

FIG. 1 is a diagram illustrating a construction of a system for detecting ground subsidence according to an embodiment of the present disclosure.

Referring to FIG. 1, a system 100 for detecting ground subsidence according to an embodiment of the present disclosure includes a LiDAR device 110 and reflection units 120a and 120b.

The system 100 for detecting ground subsidence includes the LiDAR device 110 and the at least two reflection units 120a and 12b (120a and 120b), and detects whether the ground within an area to be examined subsides. Unlike a conventional system for detecting ground subsidence, the system 100 for detecting ground subsidence can accurately detect whether the ground has subsided by using a LiDAR technology because the system includes the LiDAR device 110.

The LiDAR device 110 is disposed within a preset radius from a structure 130 within an area where the ground subsidence will be examined, and radiates light to the reflection unit 120 within the structure 130. The LiDAR device 110 is disposed at a preset height, such as being installed within a structure having a preset height or disposed at a preset height within a structure, and radiates light to each of the reflection units 120a and 120b. The LiDAR device 110 detects whether the ground has subsided and the extent of ground subsidence based on a change in the distance difference between the LiDAR device and each of the reflection units 120a and 120b.

At least two reflection units 120a and 120b are disposed in the structure 130 disposed within an area where the ground subsidence will be detected, and reflects light that is incident on the LiDAR device. The reflection units 120a and 120b are disposed at places that are higher and lower than the height at which the LiDAR device 110 is disposed, respectively. The reflection units 120a and 120b each reflect light incident on the LiDAR device at each corresponding location.

The LiDAR device 110 does not detect whether the ground has subsided and the extent of ground subsidence by radiating light to one of the reflection units 120a and 120b and measuring an absolute distance up to the corresponding reflection unit, but detects whether the ground has subsided and the extent of ground subsidence based on a distance difference between the LiDAR device and each of the at least two reflection units 120a and 120b. The LiDAR device 110 is in the state in which the LiDAR device already recognizes its installation height ($H_2+H_3$), a distance ($R_2$) (i.e., a displacement concept, hereinafter referred to as a "first distance") between the LiDAR device and the structure 130, and an installation height (H or $H_3$) within the structure 130 of the two reflection units 120a and 120b (in a process of installing the LiDAR device). Accordingly, the LiDAR device 110 may calculate a distance ($R_1$ or $R_3$) between the LiDAR device and the reflection unit 120a or 120b based on the already recognized numerical values ($R_2$ and $H_2$, $R_2$ and $H_1$) by using Pythagoras' theorem. The LiDAR device 110 stores a distance difference ($R_1-R_3$ or $R_3-R_1$) between the LiDAR device and each of the two reflection units 120a and 120b at first timing at which the detection of whether the ground has subsided and the extent of ground subsidence is performed or at reference timing.

When the ground subsides, the distance to reflection unit 120a that is installed at a higher place than the height of the LiDAR device 110, among the two reflection units 120a and 120b, decreases the difference ($H_1$) between a point ($H_2+H_3$) corresponding to the installation height of the LiDAR device 110 within the structure 130 and the installation height H of the reflection unit 120a. In contrast, the distance to reflection unit 120b that is installed at a lower place than the height of the LiDAR device 110, among the two reflection units 120a and 120b, increases the difference ($H_2$) between the point ($H_2+H_3$) corresponding to the installation height of the LiDAR device 110 within the structure 130 and the installation height ($H_3$) of the reflection unit 120b. Accordingly, a distance difference value between the LiDAR device and each of the two reflection units at the initial moment or the reference moment and a distance difference value between the LiDAR device and each of the two reflection units at the moment at which the ground subsides are different from each other. The distance between the LiDAR device and the reflection unit 120a is decreased, and the distance between the LiDAR device and the reflection unit 120b is increased. Accordingly, the distance difference ($R_1$-$R_3$ or $R_3$-$R_1$) between the LiDAR device and each of the two reflection units 120a and 120b is also changed. The LiDAR device 110 may check whether the ground has subsided based on whether the distance difference ($R_1$-$R_3$ or $R_3$-$R_1$) between the LiDAR device and each of the two reflection units 120a and 120b has been changed, and may check the extent of ground subsidence based on the extent of change.

In this case, the LiDAR device 110 does not determine whether the ground has subsided and the extent of ground subsidence, based on how an absolute distance between the LiDAR device and any one reflection unit has been changed, but determines whether the ground has subsided and the extent of ground subsidence, how a distance difference value between the LiDAR device and each of the two reflection units 120a and 120b has been changed. In general, the distance ($R_2$) between the LiDAR device 110 and the structure 130 may be at least several hundreds of m. Accordingly, an absolute distance between the LiDAR device and any one reflection unit is at least several hundreds of m. As light radiated by the LiDAR device 110 travels to the reflection unit 120, it is unclear what medium and what object the light will go through. Accordingly, there is a problem in that it is difficult for the accuracy of a value measured by the LiDAR device 110 to be reliable. In particular, the characteristics of components included in the LiDAR device 110 are changed depending on the temperature of an area where the LiDAR device 110 is placed, which may have a great effect on a value measured by the LiDAR device 110. Furthermore, in view of the characteristics of an optical component included in the LiDAR device 110, accurate measurement is possible only within a coherence length. Accordingly, it is also unreasonable to implement the coherence length of an optical component included in the LiDAR device at a corresponding length or more because the distance between the LiDAR device and the reflection unit 120 is commonly several hundreds of m as described above.

By recognizing such a point, the LiDAR device 110 determines whether the ground has subsided based on how a distance difference value between the LiDAR device and each of the two reflection units 120a and 120b has been changed. All of a problem that occurs as light radiated by the LiDAR device 110 travels to the reflection unit 120, a problem in that the characteristics of optical components are changed depending on the temperature of an area where the LiDAR device 110 is placed, and a problem in that accuracy is degraded due to the restricted coherence length of an optical component identically have an effect on the measurement of the distances between the LiDAR device 110 itself and the two reflection units 120a and 120b. Accordingly, if distance difference values between the LiDAR device 110 itself and the two reflection units 120a and 120b are calculated, all of the aforementioned problems may be offset. The LiDAR device 110 may perform the aforementioned operation by including components illustrated in FIG. 2 or 3.

Figure 2:
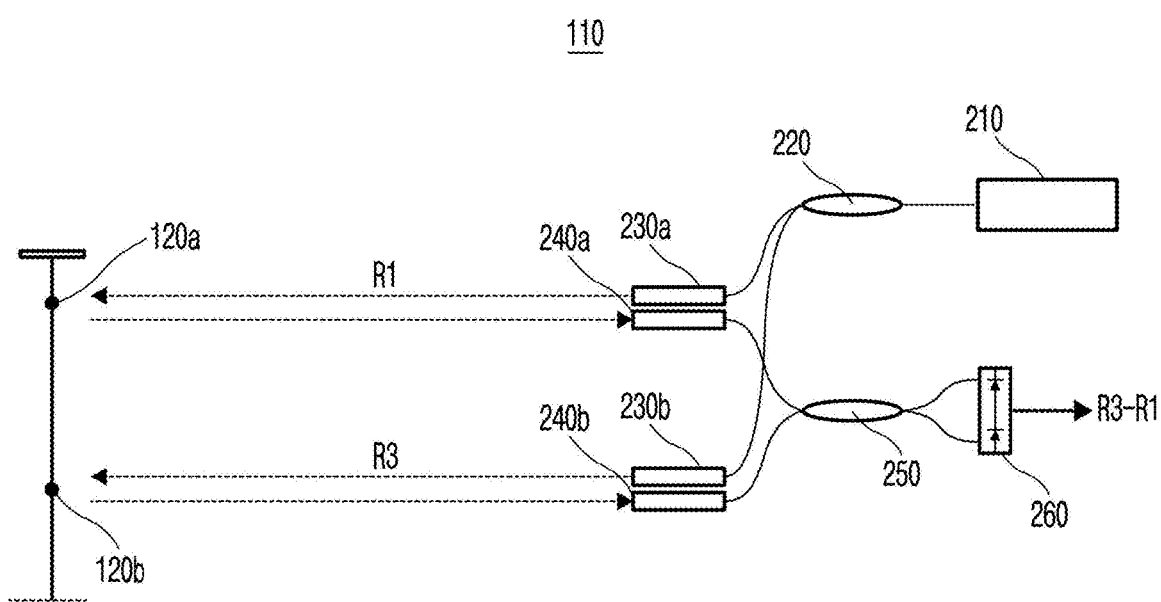
FIG. 2 is a diagram illustrating a construction of a LiDAR device according to an embodiment of the present disclosure.

FIG. 2 is a diagram illustrating a construction of a LIDAR device according to an embodiment of the present disclosure.

Referring to FIG. 2, a LiDAR device 110 according to an embodiment of the present disclosure includes a light source unit 210, a splitter 220, first lenses 230a and 230b, second lenses 240a and 240b, a coupler 250, a light-receiving unit 260, and a controller (not illustrated).

The light source unit 210 generates light to be radiated to the two reflection units 120a and 12b.

The splitter 220 receives and branches the light generated the light source unit 210, and makes the pieces of branched light incident on the first lenses 230a and 230b, respectively. The splitter 220 receives and branches the light radiated by the light source unit 210 at a preset ratio (preferably 50:50), and makes the pieces of branched light to the first lenses 230a and 230b, respectively.

The first lenses 230a and 230b focus the pieces of light, which are branched by the splitter 220 and incident on the first lenses 230a and 230b, onto the reflection units 120a and 120b, respectively. The first lenses 230a and 230b focus the pieces of light incident thereon on the reflection units 120a and 120b, respectively, so that the pieces of light are radiated toward the reflection units 120a and 120b, respectively.

The second lenses 240a and 240b receive pieces of light reflected by the reflection units 120a and 120b, respectively. The second lenses 240a and 240b receive the pieces of light reflected by the reflection units 120a and 120b and transmit the pieces of light to the coupler 250.

The coupler 250 receives the pieces of light incident via the second lenses 240a and 240b, makes the pieces of light interfere with each other, and transmits the interfered light to the light-receiving unit 260.

The light-receiving unit 260 senses the interfered light from the coupler 250.

The controller (not illustrated) calculates distance differences between the LiDAR device 110 and the two reflection units 120a and 120b based on the interfered light sensed by the light-receiving unit 260. The controller (not illustrated) may calculate the distance between the LiDAR device 110 and the reflection unit based on a change between the frequency of light when the light is radiated to the reflection unit 120 and the frequency of received light, and may calculate the distance between the LiDAR device 110 and the reflection unit based on a time difference between timing at which light is radiated to the reflection unit 120 and timing at which the light is received again. In this case, a derived calculation value is a distance difference between the LiDAR device and each of the two reflection units, not an absolute distance between the LiDAR device 110 and a specific reflection unit, because the distance between the LiDAR device 110 and the reflection unit is calculated based on light that is subjected to interference via the light-receiving unit 260. The controller (not illustrated) calculates and derives a distance difference between the LiDAR device 110 and each of the two reflection units 12ba and 120b, and detects whether the ground has subsided and the extent of subsidence by comparing the derived value with a value at the first timing or the reference timing.

The length of the structure 130 may be changed due to a temperature change in addition to ground subsidence. A temperature difference between the summer and the winter may be approximately 40 to 50° C. or more. Accordingly, if the structure 130 is exposed to such a temperature change, the structure 130 is stretched in a height direction thereof. In this case, if a structure in which the LiDAR device 110 is installed and the structure 130 are implemented with the same material, extents that the structure and the structure 130 are stretched are the same. Furthermore, the two reflection units 120a and 120b are disposed at relatively high and low locations, respectively, on the basis of the height of the LiDAR device 110 within the structure 130. Accordingly, the difference ($H_1$ or $H_2$) between the point ($H_2+H_3$) corresponding to the installation height of the LiDAR device 110 and the installation height (H or $H_3$) of each of the two reflection units 120a and 120b is identically increased or decreased. In contrast, if the ground subsides, any one of the aforementioned differences ($H_1$ or $H_2$) is decreased, and the other thereof is increased. The controller (not illustrated) may distinguish between a case in which the ground subsides and a case in which the structure 130 is stretched and thus the location of each reflection unit is changed based on such a characteristic.

Figure 3:
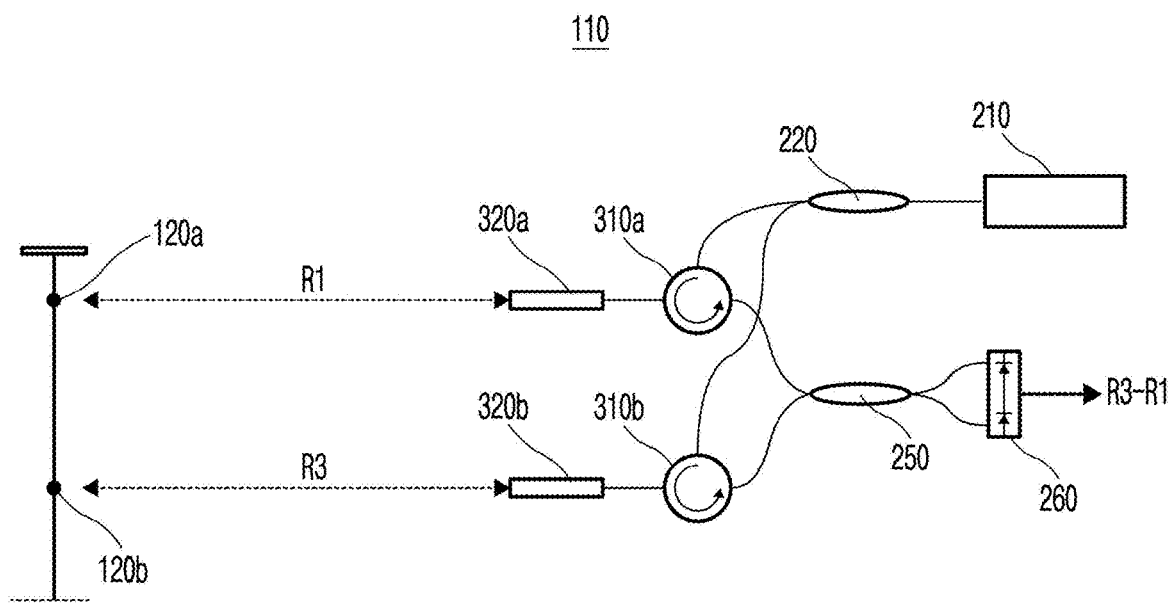
FIG. 3 is a diagram illustrating a construction of a LiDAR device according to another embodiment of the present disclosure.

FIG. 3 is a diagram illustrating a construction of a LiDAR device according to another embodiment of the present disclosure.

Referring to FIG. 3, a LiDAR device 110 according to another embodiment of the present disclosure may include circulators 310a and 310b and lens units 320a and 320b, instead of the first lenses 230a and 230b and the second lenses 240a and 240b, among the components of the LiDAR device 110 according to an embodiment of the present disclosure.

The splitter 220 receives and branches light that is radiated by the light source unit 210, and makes the pieces of branched light incident on the circulators 310a and 310b, respectively.

The circulators 310a and 310b transmit the pieces of light incident from the splitter 220 to the lens units 320a and 320b, and transmit pieces of light incident from the lens units 320a and 320b to the coupler 250.

The lens units 320a and 320b focus the pieces of light transmitted by the circulators 310a and 310b on the reflection units 120a and 120b, respectively, receive pieces of light reflected by the reflection units 120a and 120b, and transmits the pieces of received light to the circulators 310a and 310b, respectively.

Figure 4:
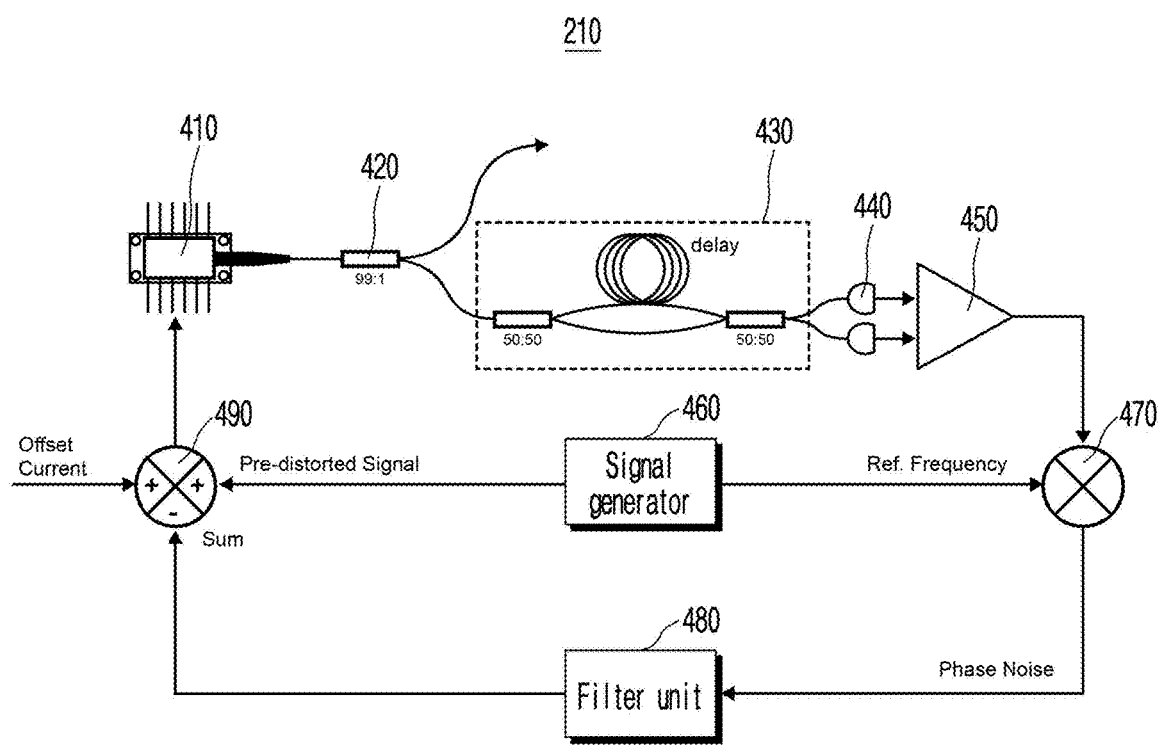
FIG. 4 is a diagram illustrating a construction of a light source unit according to an embodiment of the present disclosure.

FIG. 4 is a diagram illustrating a construction of the light source unit according to an embodiment of the present disclosure.

Referring to FIG. 4, the light source unit 210 according to an embodiment of the present disclosure includes a light source 410 and a stabilization unit (not illustrated). The stabilization unit (not illustrated) includes a distributor 420, n interference system 430, a light-receiving unit 440, an amplifier 450, a signal generator 460, a mixer 470, a filter unit 480, and an error compensation unit 490.

The light source 410 receives a current and makes laser light for detecting a target oscillated. The light source 410 may be implemented with a narrow line width laser diode. Detailed structures of the light source 410 and a driving circuit thereof are described later with reference to FIG. 5.

The distributor 420 distributes light output by the light source 410 into light for an operation (detecting a target) of the LiDAR device 110 and light for frequency modulation linearization. The distributor 420 may distribute the light for an operation of the LiDAR device at a preset ratio (e.g., 90% or more) compared to the light for frequency modulation linearization. The light distributed by the distributor 420 may be branched to a separate component (not illustrated) for detection within the LiDAR device and radiated to the outside.

The light that is branched for frequency modulation linearization from the distributor 420 is applied to the interference system 430. The interference system 430 temporally delays some of the applied light, and makes undelayed light and the temporally delayed light interfere with each other. Furthermore, the interference system may temporally delay some of the applied light and/or the phase of the applied light, and makes undelayed light and the temporally delayed light and/or the phase-delayed light interfere with each other.

The interference system 430 includes a first distributor, a delay line, and a second distributor, and it forms undelayed light and temporally delayed light and makes the undelayed light and the temporally delayed light interfere with each other. Accordingly, the following interfered light is formed.

$$x_{MZI}(t) = \sin(\kappa\tau_d t + \phi_n(t))$$

wherein $x_{MZI}(t)$ (hereinafter referred to as "interfered light") denotes interfered light between temporally undelayed light and temporally delayed light. $\varphi_N(t)$ denotes generated phase noise.

Furthermore, the interference system 430 may increase the number of pieces of generated interfered light by including more distributors. Furthermore, the interference system 430 may further include a phase delayer, and it may form light both the time and phase of which have not been delayed, light the time of which has been delayed and the phase thereof has not been delayed, and light both the time and phase of which have been delayed and make all of the pieces of light interfere with each other. Accordingly, the interference system 430 may form a plurality of pieces of interfered light.

The light-receiving unit 440 senses the interfered light in the form of an interference signal (or current signal).

The amplifier 450 amplifies the interference signal of the light-receiving unit 440 and converts the interference signal into a voltage signal. The amplifier 450 may be implemented with a trans-impedance amplifier (TIA), and may perform he aforementioned operation.

The signal generator 460 generates an ideal interfered light ($X_{Ref}(t)$) when phase noise is not generated in the form of a voltage signal (hereinafter referred to as a "reference signal"), and applies the reference signal to the mixer 470. The reference signal generated by the signal generator 460 is expressed as follows.

$$x_{Ref}(t) = \cos(\kappa\tau_d t)$$

The reference signal generated by the signal generator 460 has a form in which a square wave and the harmonics signal of the square wave have been combined. In this case, the reference signal generated by the signal generator 460 has a form including only a pure square wave and the harmonics signal thereof. Other noise has a form not including the pure square wave and the harmonics signal thereof.

Furthermore, the signal generator 460 generates a signal having a partially distorted triangular waveform and applies the signal having the triangular waveform to the error compensation unit 490 so that the error compensation unit 490 can apply a current the phase noise of which has been compensated for to the light source 410.

The mixer 470 receives the interference signal from the amplifier 450 and the reference signal from the signal generator 460, and mixes the interference signal and the reference signal. The mixer 470 may perform a plurality of analog multiplication operations or may perform one or more difference operations along with the multiplication operations. The mixer 470 mixes the interference signal and the reference signal as follows.

$$x_{Mix(t)} \equiv x_{MZI}(t) \otimes x_{Ref}(t) =$$

$$\sin(\kappa\tau_d t + \phi_n(t)) \times \cos(\kappa\tau_d t) = \frac{1}{2}\sin(\phi_N(t)) + \frac{1}{2}\sin(\kappa\tau_d t + \phi_n(t))$$

The mixer 470 outputs a signal including only a phase noise component and a harmonics signal by mixing the interference signal and the reference signal.

The filter unit 480 receives the signal mixed by the mixer 470, and filters out the remaining components other than the signal including only the phase noise component. The filter unit 480 may be implemented with any filter capable of filtering out the remaining component other than the signal including only the phase noise component. The filter unit 480 may be implemented with a band pass filter (BPF) or a band reject filter (BRF), for example, and may be implemented with a notch filter in order to derive a more excellent effect.

Furthermore, the filter unit 480 may further include a loop filter in addition to the aforementioned filters. The loop filter removes other noise included in a signal, and can improve the linearity of a signal to be output by the light source 410.

The error compensation unit 490 receives a phase noise signal that has experienced the filter unit 480, the signal having the partially distorted triangular waveform from the signal generator 460, and an offset signal from the outside, and applies a current having an error compensated for (i.e., a current that enables the light source 410 to output an ideal output signal) to the light source 410. The error compensation unit 490 compensates for the phase noise signal with respect to the current applied to the light source 410 because a light signal that is output by the light source 410 is proportional to the current applied to the light source 410 for an operation.

In this case, the phase noise signal output by the mixer 470 has a square wave form. However, it is preferred that in order for the error compensation unit 490 to compensate for an error more smoothly, the phase noise signal has a triangular wave form (similar to the frequency form of a signal that is output by the light source).

To this end, both the phase noise signal that has experienced the filter unit 480 and the signal having the partially distorted triangular waveform from the signal generator 460 are applied to the error compensation unit 490. The error compensation unit 490 mixes the phase noise signal and the signal having the partially distorted triangular waveform, and outputs the phase noise signal (having a square wave form) of the filter unit 480 as a triangular waveform signal. In this case, when the triangular waveform signal having a whole form is applied from the signal generator 460 to the error compensation unit 490, a phase noise signal that is output has a form in which the phase noise signal has a triangular waveform, but may have a partially distorted waveform. As the signal having the partially distorted triangular waveform is applied from the signal generator 460 to the error compensation unit 490, a phase noise triangular waveform signal having a whole form may be formed, and the phase noise signal can be accurately compensated for.

Figure 5:
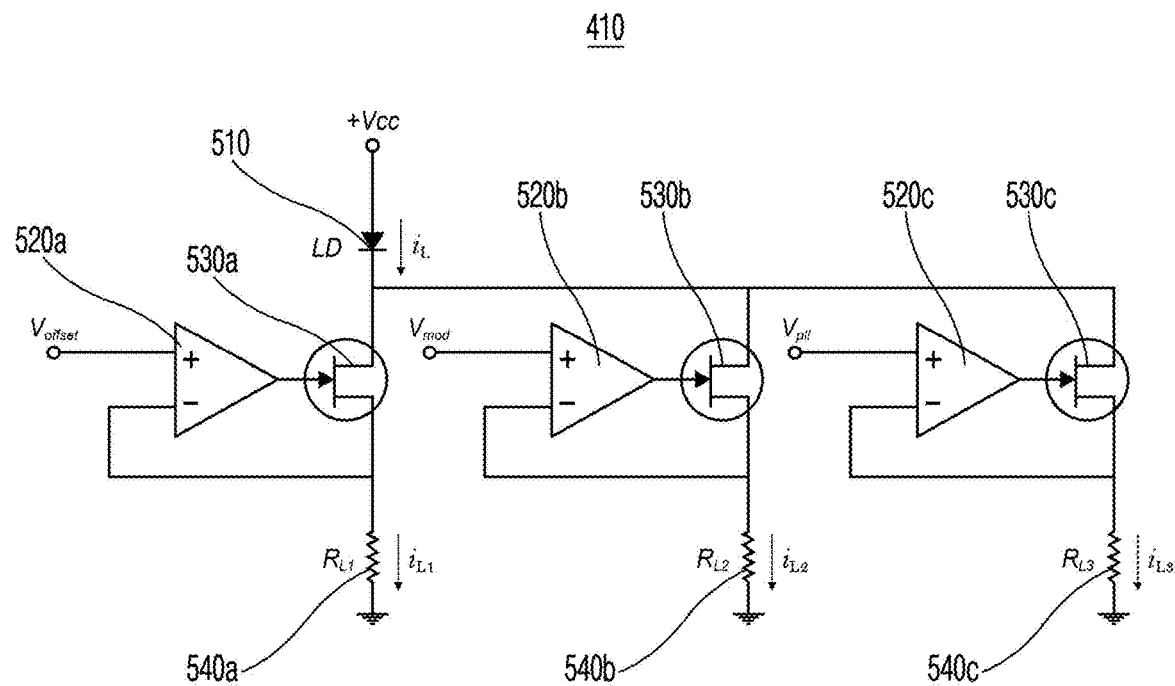
FIG. 5 is a circuit diagram of a light source and a light source driving circuit according to an embodiment of the present disclosure.
Figure 6A:
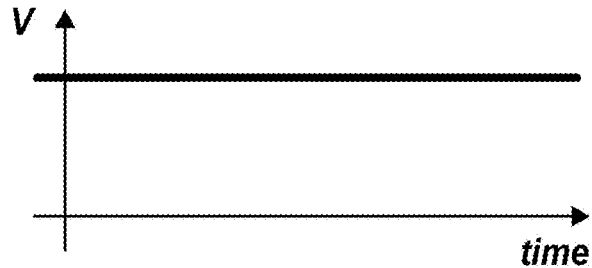
FIGS. 6A-6C are graphs illustrating waveforms of power supplies that are applied to the LiDAR device according to an embodiment of the present disclosure.
Figure 6B:
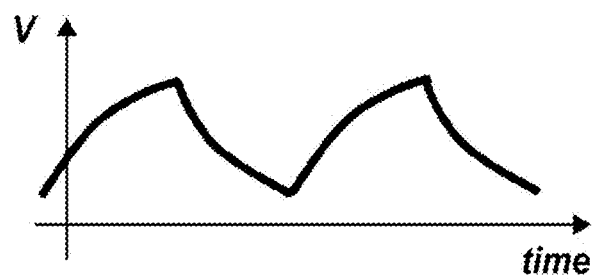
Figure 6C:
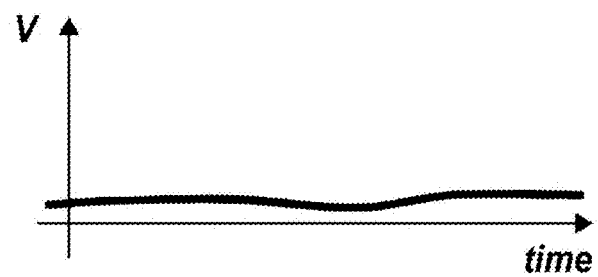
Figure 7:
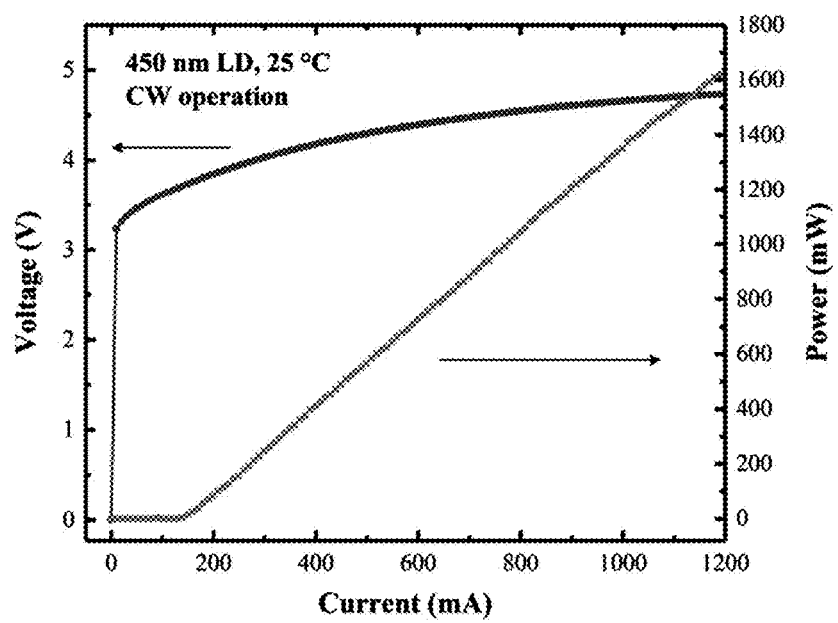
FIG. 7 is a graph illustrating relations between a current, voltage, and power of the light source.

FIG. 5 is a circuit diagram of the light source and a light source driving circuit according to an embodiment of the present disclosure. FIGS. 6A-6C are graphs illustrating waveforms of power supplies that are applied to the LiDAR device according to an embodiment of the present disclosure. FIG. 7 is a graph illustrating relations between a current, voltage, and power of the light source.

Referring to FIG. 5, the light source and the light source driving circuit 410 within the light source unit 210 according to an embodiment of the present disclosure includes a laser diode (LD) 510, a plurality of amplifiers 520a to 520n, a plurality of switches 530a to 530n, and a plurality of load resistors 540a to 540n.

The laser diode 510 is an element for making a laser oscillated. When a current having a threshold value or more flows in the laser diode 510, the intensity (power) of an oscillating laser is proportional to a driving current as illustrated in FIG. 7.

As illustrated in FIGS. 6A-6C, a voltage that is input to the light source driving circuit 410 within the FMCW LiDAR device includes an offset voltage (Voffset) (illustrated in FIG. 6A), a voltage ($V_{mod}$) (illustrated in FIG. 6B) for frequency modulation, and a PLL compensation voltage ($V_{pll}$) (illustrated in FIG. 6C) for compensating for phase noise. In this case, the size of the offset voltage ($V_{offset}$) is relatively very large than that of another voltage. Accordingly, a conventional FMCW LiDAR device has a problem because a light source and a driving driver within the conventional FMCW LiDAR device process all of light sources having different sizes by using the same load resistor. In contrast, the light source driving circuit 410 includes the plurality of amplifiers 520a to 520n, the plurality of switches 530a to 530n, and the plurality of load resistors 540a to 540n.

The laser diode 310 makes a laser oscillated with an intensity that is proportional to a current ($i_L$) that flows into the light source driving circuit 410.

The amplifiers 520a to 520n receive different voltages that are input to the light source driving circuit 410, transmit the different voltages to the load resistors 540a to 540n, respectively, and also output output signals to the gate stages of the switches 530a to 530n, respectively. Accordingly, each of the amplifiers 520a to 520n transmits the input voltage to each of the load resistors. When the voltage is input, each of the switches 530a to 530n is connected so that the current ($i_L$) that flows into the light source driving circuit can be transmitted to the laser diode 510.

Each of the switches 530a to 530n controls whether a current will flow into the light source driving circuit. The On/Off of each of the switches 530a to 530n is controlled as a voltage is input from each of the amplifiers 520a to 520n to the gate terminal of each switch depending on whether the voltage is applied to the light source driving circuit 410.

As described above, the voltages that are input to the light source driving circuit 410 have different amounts and waveforms. Accordingly, the light source driving circuit 410 includes the amplifiers 520a to 520n, the switches 530a to 530n, and the load resistors 540a to 540n, each one corresponding to the number of voltages or more, which are input to the light source driving circuit 410.

In this case, the size of each of the load resistors 540a to 540n is differently implemented depending on the amount of each different voltage applied thereto so that noise and the generation of heat from each load resistor can be reduced as much as possible and an output having a predetermined level or more can be secured in the state in which a current is not too much reduced. Through such a structure, a different voltage that is input to the light source driving circuit 410 is applied to one input stage of each of the amplifiers 520*a* to 520*n*. Each of the switches 530*a* to 530*n* is connected to the output stage of each of the amplifiers 520*a* to 520*n*. Each of the different load resistors 540*a* to 540*n* (regardless of the size of the load resistor) is connected to the other input stage of each of the amplifiers 520*a* to 520*n*, so that a current according to the voltage is generated.

As exemplified in FIG. 5, a current ($i_L$) that flows along the amplifier 520*a*, the switch 530*a*, and the load resistor 540*a* to which the offset voltage ($V_{offset}$) is applied operates as follows.

$$i_{L1} = \frac{V_{offset}}{R_{L1}}$$

wherein $R_{L1}$ denotes the size of the load resistor 540*a*. Likewise, a current ($i_{L2}$) that flows along the load resistor 540*b* to which the voltage ($V_{mod}$) for frequency modulation is applied and the current ($i_{L3}$) that flows along the load resistor 540*c* to which the PLL compensation voltage ($V_{pll}$) is applied operate as follows.

$$i_{L2} = \frac{V_{mod}}{R_{L2}}$$

$$i_{L3} = \frac{V_{pll}}{R_{L3}}$$

wherein $R_{L2}$ and $R_{L3}$ denote the sizes of the load resistor 540*b* and the load resistor 540*c*, respectively.

The current ($i_L$) that flows into the laser diode 510 operates as follows.

$$i_L = i_{L1} + i_{L2} + i_{L3}$$

In this case, the size of the load resistor 540*a* connected to one input stage of the amplifier 520*a* to which the offset voltage is applied is implemented to be relatively small. The size of each of the load resistors 540*b* and 540*c* connected to one input stages of the amplifiers 520*b* and 520*c* to which the voltage for frequency modulation and the PLL compensation voltage are applied, respectively, is implemented to be relatively large. Noise within the current that is generated via each of the load resistors 540*a* to 540*c* can be minimized and the amount of a current that flows into each of the load resistors 540*a* to 540*c* can also be increased because each of the load resistors 540*a* to 540*c* is implemented to have a different size depending on the amount of a voltage applied to each of the load resistors 540*a* to 540*c* as described above. Accordingly, since a current value flowing into each of the load resistors 540*a* to 540*c* is optimized and an excessive current may not flow into any one of the load resistors 540*a* to 540*c*, power that is consumed by each of the load resistors 540*a* to 540*c* can be reduced and thus the amount of heat generated by a device can also be reduced.

As described above, the light source and the light source driving circuit within the light source driving circuit 410 do not operate based on the sum of voltages that are applied thereto as in a conventional technology, but generate each current by applying each application voltage to each load resistor having a size that complies with the application voltage and apply the sum of the currents to the laser diode 510. Accordingly, the generation of noise can be minimized, and heat generated from the load resistor can be minimized.

Furthermore, FIG. 5 illustrates that the offset voltage is applied to one amplifier 520*a*, the switch 530*a*, and the load resistor 540*a*. In contrast, a light source and a light source driving circuit within the light source driving circuit 410 may distribute an offset voltage having a relatively large amount, and may separately input the distributed voltages to the plurality of amplifiers 520*a* to 540*n*, the switches 530*a* to 530*n*, and the load resistors 540*a* to 540*n*. In this case, each of the amplifiers 520*a* to 520*n*, each of the switches 530*a* to 530*n*, and each of the load resistors 540*a* to 540*n*, which are separated, may also be implemented to have a structure in which currents generated via the load resistors, respectively, are added like the remaining amplifiers, switches, and the load resistor. Accordingly, all of the currents generated by the load resistors, respectively, may be added and applied to the laser diode 510.

In this case, if the amplifier 520*a*, the switch 530*a*, and the load resistor 540*a* are separated in an n number, composite resistance of the separated load resistors is implemented to be identical with the size of the load resistor 540*a*. For example, assuming that the size of the load resistor 540*a* is R, a load resistor that is separated in an n number may have a resistance value of n*R.

A voltage (i.e., offset voltage) having a relatively large amount may be applied to the load resistor, a problem in that the amount of heat generated is increased can be solved, and the generation of noise can be minimized.

The LiDAR device 110 may include a central processing unit (CPU) that is implemented with a controller, an integrated circuit, a microphone chip, a computer, or other computing device.

The LiDAR device 110 may include a memory module. The memory module may include a device capable of storing an instruction which may be accessed by RAM, ROM, flash memory, a hard drive, or a CPU and may be read and executed by a machine.

The memory module may store instructions indicated by a CPU so that each component within the LiDAR device 110 performs the aforementioned operation when the CPU operates.

The instruction may include one or more logic or algorithms that are written in any programming language. For example, a machine language may be directly executed by a processor. An assembly language, an object-oriented programming (OOP) language, a script language, and a microcode may be compiled or assembled as a machine-readable and executable instruction and stored in the memory module. Alternatively, the machine-readable and executable instruction may be written in a hardware description language (HDL), for example, like logic that is implemented through a field programming gate array (FPGA) component or an application-specific integrated circuit (ASIC).

The above description is merely a description of the technical spirit of the present embodiment, and those skilled in the art may change and modify the present embodiment in various ways without departing from the essential characteristic of the present embodiment. Accordingly, the embodiments should not be construed as limiting the technical spirit of the present embodiment, but should be construed as describing the technical spirit of the present embodiment. The technical spirit of the present embodiment is not restricted by the embodiments. The range of protection of the present embodiment should be construed based on the following claims, and all of technical spirits within an equivalent range of the present embodiment should be construed as being included in the scope of rights of the present embodiment.

What is claimed is:

1. A system for detecting ground subsidence, which detects whether a ground has subsided within an area where the subsidence of the ground is to be examined, the system comprising:
    at least two reflection units installed in a structure disposed within an area where a subsidence of a ground is to be examined and each configured to reflect light incident thereon; and
    a LiDAR device disposed within a preset radius from the structure,
    wherein the LiDAR device is configured to:
    receive the reflected light from each of the at least two reflection units, make the reflected light interfere with each other, and calculate a distance difference between the LiDAR device and each of the at least two reflection units based on the interfered light,
    detect whether the ground has subsided and an extent of the ground subsidence based on the distance difference between the LiDAR device and each of the reflection units,
    store, as a reference value, a distance difference between the LiDAR device and each of the at least two reflection units at first timing at which the detection of whether the ground has subsided and an extent of ground subsidence is started or at preset reference timing, and
    check whether the ground has subsided based on whether the distance difference between the LiDAR device and each of the at least two reflection units is different from the reference value at arbitrary timing by comparing the distance difference with the reference value.

2. The system of claim 1, wherein the LiDAR device is disposed at a preset height.

3. The system of claim 2, wherein the LiDAR device is installed in the structure having a preset height or is disposed at a preset height within the structure.

4. The system of claim 1, wherein the at least two reflection units are disposed at places that are higher and lower than a height at which the LiDAR device is disposed, respectively.

5. The system of claim 1, wherein the LiDAR device checks the extent of ground subsidence based on an extent that the distance difference between the LiDAR device and each of the at least two reflection units is different from the reference value at the arbitrary timing by comparing the distance difference with the reference value.

6. The system of claim 1, wherein the LiDAR device comprises a light source unit, a splitter, a plurality of first lenses, a plurality of second lenses, a coupler, a light-receiving unit, and a controller.

7. The system of claim 6, wherein the splitter receives light generated by the light source unit and branches the light into the plurality of first lenses.

8. The system of claim 6, wherein the plurality of first lenses focuses pieces of light, which are branched by the splitter and incident thereon, onto the reflection units, respectively.

9. The system of claim 1, wherein the LiDAR device comprises a light source unit, a splitter, a plurality of circulators, a plurality of lens units, a coupler, a light-receiving unit, and a controller.

10. The system of claim 9, wherein the circulator transmits light that is incident from the splitter to the plurality of lens units and transmits light that is incident from the plurality of lens units to the coupler.

* * * * *